United States Patent [19]

Bott

[11] Patent Number: 4,890,777

[45] Date of Patent: Jan. 2, 1990

[54] LUGGAGE CARRIER SLAT

[76] Inventor: John A. Bott, 931 Lakeshore Dr., Grosse Pointe Shores, Mich. 48236

[21] Appl. No.: 236,155

[22] Filed: Aug. 25, 1988

[51] Int. Cl.[4] .............................................. B60R 9/04
[52] U.S. Cl. .................................... 224/326; 224/327; 224/325; 224/324
[58] Field of Search ............... 224/309, 316, 317, 324, 224/325, 326, 327; 410/101, 106, 108, 115; 296/37.7, 76, 210

[56] References Cited

U.S. PATENT DOCUMENTS

| 3,519,179 | 7/1970 | Stephan | 224/326 |
|---|---|---|---|
| 4,015,760 | 4/1977 | Bott | 224/324 |
| 4,055,284 | 10/1977 | Bott | 224/324 |
| 4,099,658 | 7/1978 | Bott | 224/326 |
| 4,165,827 | 8/1979 | Bott | 224/326 |
| 4,170,322 | 10/1979 | Bott | 224/326 |
| 4,174,794 | 11/1979 | Bott | 224/320 |
| 4,277,009 | 7/1981 | Bott | 224/309 |
| 4,343,419 | 8/1982 | Mareydt | 224/326 |
| 4,432,478 | 2/1984 | Bott | 224/321 |
| 4,448,336 | 5/1984 | Bott | 224/309 |
| 4,448,337 | 5/1984 | Cronce | 224/321 |
| 4,500,020 | 2/1985 | Rasor | 224/321 |
| 4,501,386 | 2/1985 | Rasor et al. | 224/326 |

Primary Examiner—Ernest G. Cusick
Attorney, Agent, or Firm—Harness, Dickey, Pierce

[57] ABSTRACT

An article supporting slat is adapted to be mounted in contiguous relationship to a surface portion of a vehicle and includes a longitudinally extending upwardly facing article supporting surface having an upwardly presenting groove. A one-piece end cap member is interfitted with one end of the slat and includes a tongue adapted to be received within the groove. A mounting pad is disposed between the end cap member and the vehicle surface portion. The mounting pad includes resilient fingers for releasably retaining the mounting pad and the slat together as an integral unit.

15 Claims, 3 Drawing Sheets

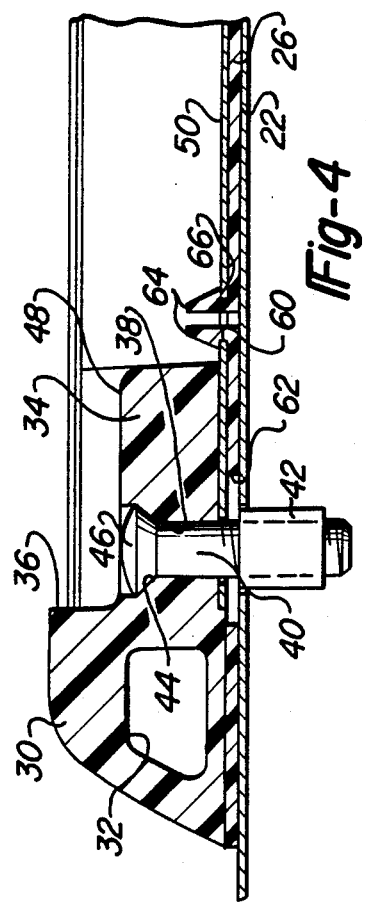
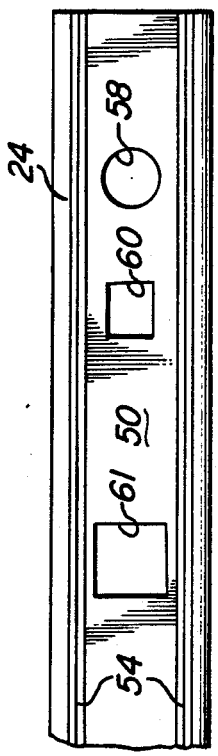
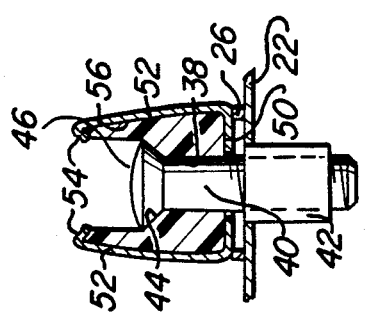
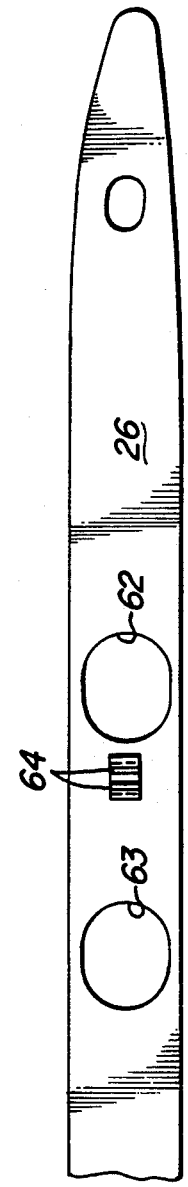

LUGGAGE CARRIER SLAT

BACKGROUND OF THE INVENTION

1. Field of the Invention

The present relates to an article carrier for automotive vehicles, more particularly to, a luggage carrier slat of an article carrier for an automotive vehicle.

2. Description of Related Art

Automobile luggage racks frequently employ two separate sub assemblies or potions: a rectangular framework which surrounds the load to be carried and a plurality of slats which rest on the roof or other automobile body surface and carry the weight of the load. In such constructions, the framework and the slats are often secured to the automobile body independently of one another.

In my prior U.S. Pat. No. 4,170,322, I disclosed a vehicle article carrier having a slat which is attractive in appearance, relatively inexpensive to manufacture and presents a minimal wind resistance profile. The carrier utilized slats of varying shape, including slats having special upper grooves providing means of attachment for various article securing devices. The opposite ends of the slats were fitted with special end caps that were fastened directly to the automobile body surface on which the device was mounted. The end caps helped to hold the slats in place on the automobile body. The end caps also closed the opposite ends of the slate (which were hollow) and provided an eyelet or opening to which a rope, hook, or other article securing device may be affixed.

SUMMARY OF THE INVENTION

Accordingly, the present invention is an article supporting slat adapted to be mounted in contiguous relationship to a surface portion of a vehicle. The slat has an upwardly presenting groove. A one-piece cap member is interfitted with one end of the slat and includes a tongue adapted to be received within the groove. A mounting pad is disposed between the end cap member and the slat and the vehicle surface portion. The mounting pad includes means for releasably retaining the mounting pad and the slat together as an integral unit.

One advantage of the present invention is that the mounting pad can be releasably retained to the slat. This prevents the mounting pad from shifting or moving or being separated from the slat. Further, the present invention presents a slat which is attractive in appearance, relatively inexpensive to manufacture and presents minimal wind resistance profile. Still further, the slat of the present invention provides an eyelet or opening to which a rope, hook or other article securing device may be affixed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a sectional view of the structure illustrated in FIG. 2 taken along line 4—4 thereof;

FIG. 5 is a sectional view of the structure illustrated in FIG. 2 taken along the line 5—5 thereof;

FIG. 6 is a partial bottom view of the slat of FIG. 3;

FIG. 7 is a partial plan view of a mounting pad illustrated in FIG. 1;

DESCRIPTION OF THE PREFERRED EMBODIMENT

Figure 1:
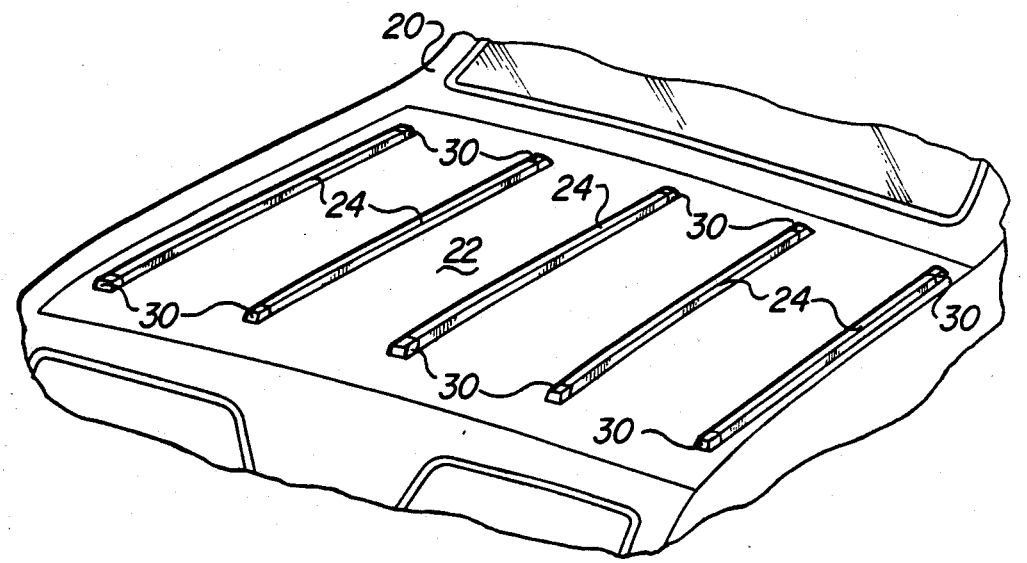
FIG. 1 is a fragmentary perspective view of an automobile showing an article carrier mounted thereon which is constructed in accordance with the principles of the present invention.
Figure 2:
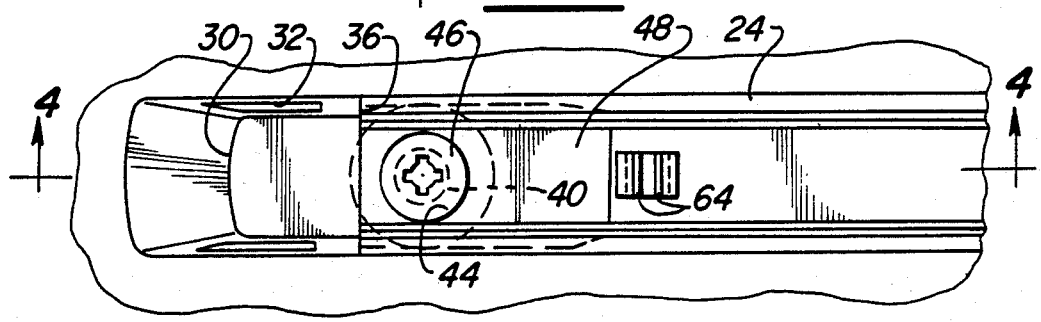
FIG. 2 is an enlarged partial plan view of a portion of the structure illustrated in FIG. 1.
Figure 3:
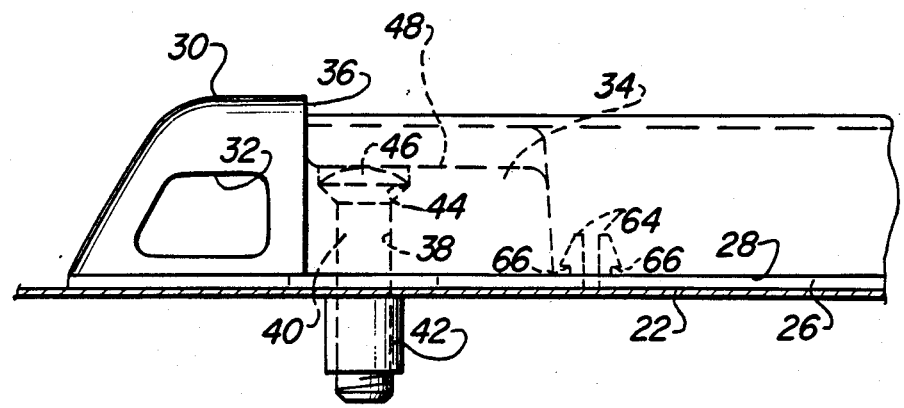
FIG. 3 is an elevational view of the structure illustrated in FIG. 2.

FIG. 1 depicts an automobile 20 having a truck lid 22 on which are mounted a plurality of identical, parallel, transversely spaced slats 24. Although the slats 24 are shown mounted on the trunk lid 22, the article carrier of the present invention may be mounted with equal utility on an automobile roof or any other generally horizontal exterior body portion of an automobile. As illustrated in FIGS. 2 through 4, interposed between the slats 24 and the trunk lid 22 are elastomeric mounting pads 26 on which flat bottom surfaces 28 of the slats 24 rest. Each slat 24 of the assembly 10 consists of a hollow roll formed steel fitted with a pair of end caps 30 at its opposite ends as further illustrated in FIGS. 8 and 9. The end caps 30 are of identical construction and are conveniently made from a resinous plastic material by means of the injection molding process.

Figure 9:
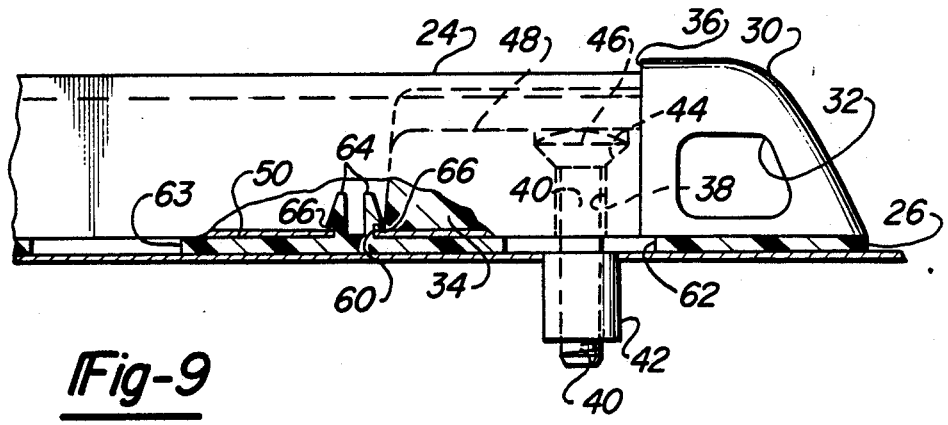
FIG. 9 is an elevational view of the structure illustrated in FIG. 8.

Each end cap 30 will be seen to have an eyelet 32 for the reception of a rope or other article securing device. Each end cap 30 is further formed with a tongue 34 for telescopically interfitting onto the end of the slat 24 and with an end wall 36 which closes the end of the slat 24 and covers the hollow interior of the end of the slat 24 from view. The tongues 34 of the end caps 30 are made with a fastener hole 38 for the reception of fasteners 40 which are secured to the automobile roof by a corresponding nut 42. Both the fastener 40 and nut 42 are threaded as illustrated in FIG. 9. Alternatively, the fastener hole 38 may be threaded. The fastener hole 38 also includes a countersunk portion 44, to allow the head 46 of the fastener 40 to be at least flush or rest below the upper surface 48 of the tongue 34.

FIG. 5 depicts the cross sectional shape of the slat 24 which will be seen to have a bottom wall 50 and a pair of upwardly extending side walls 52 formed with a pair of downwardly converging supporting ledges 54 at the upper ends of the side walls 52. The side walls 52 define a channel or groove 56 which is open to the top of the slat 24.

Figure 8:
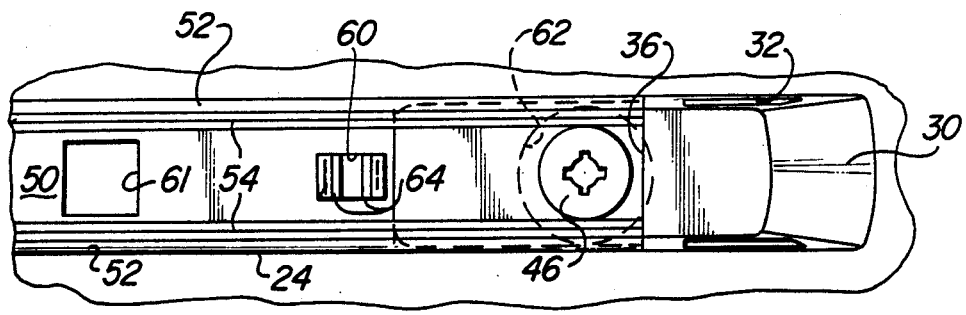
FIG. 8 is a partial plan view of a portion of the structure illustrated in FIG. 1.
Figure 10:
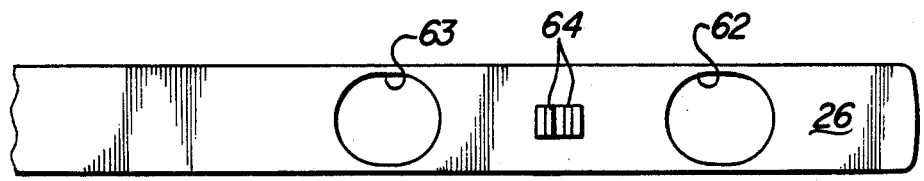
FIG. 10 is a portion of the mounting pad of FIG. 8.

As illustrated in FIG. 6, the slat 24 includes a circular aperture 58 to allow the fastener 40 to pass through the slat 24. The slat 24 also includes a first rectangular aperture 60 and a second rectangular aperture 61 formed in the bottom wall 50. As illustrated in FIGS. 7 and 10, the mounting pad 26 includes a first elliptical aperture 62 and a second elliptical aperture 63 formed in the mounting pad 26. The first elliptical aperture 62 allows the fastener 40 to pass through the mounting pad 26. The mounting pad 26 also includes a pair of upwardly extending resilient fingers 64. The fingers 64 are deflected or moved inwardly toward each other and pass through the first rectangular aperture 60. Each of the fingers 64 have a groove or slot 66 which engages and overlaps the bottom wall 50 when returning to their original undeflected position as illustrated in FIGS. 2, 8 and 9. The fingers 64 of the mounting pad 26 cooperate with the first rectangular aperture 60 to releasably retain or secure the mounting pad 26 and slot 24 together as an integral unit.

The present invention has been described in an illustrative manner. It is to be understood that the terminology which has been used is intended to be in the nature of words of description rather than limitation.

Obviously, many modifications and variations of the present invention are possible in light of the above teachings. Therefore, the present invention may be practiced otherwise than as specifically described.

I claim:

1. In an article carrier for an automotive vehicle, an article supporting slat adapted to be mounted in contiguous relation to a surface portion of the vehicle,
   said slat extending generally parallel to the surface portion,
   said slat having a bottom wall and a pair of upwardly extending side walls, said side walls defining an upwardly presenting groove,
   a one-piece end cap member interfitted with one end of said slat and including a tongue adapted to be received within said groove;
   a mounting pad disposed between said end cap member and said bottom wall of said slat and the surface portion; and
   said mounting pad including means for releasably retaining said mounting pad and said slat together as an integral unit, wherein said slat includes means forming an aperture, said retaining means comprising a pair of longitudinally spaced resilient fingers extending upwardly from said mounting pad and through said aperture to retain said mounting pad and said slat together as an integral unit.

2. An article carrier as set forth in claim 1 including fastening means for securing said end cap member and said slat to the surface portion.

3. An article carrier as set forth in claim 2 wherein said fastening means extends through said tongue of said end cap member and said slat and said mounting pad and includes a retaining element to secure said end cap member and said slat to the surface portion of said vehicle.

4. An article carrier as set forth in claim 3 wherein said fastening means comprises a threaded fastener element.

5. An article carrier as set forth in claim 4 wherein said tongue includes means forming an aperture to allow said threaded fastener element to pass through.

6. An article carrier as set forth in claim 5 wherein said aperture is threaded.

7. An article carrier as set forth in claim 1 wherein said end cap member includes means forming an eyelet.

8. An article carrier as set forth in claim 7 wherein said end cap member is disposed in longitudinal abutting relationship with said slat.

9. An article carrier as set forth in claim 1 wherein each of said fingers include a slot to allow said each of said fingers to overlap said slat when disposed in said aperture.

10. In an article carrier for an automotive vehicle, an article supporting slat adapted to be mounted in contiguous relationship to a surface portion of the vehicle,
    said slat extending generally parallel to the surface portion,
    said slat having a longitudinally extending bottom wall and a pair of longitudinally extending said walls, said side walls forming an upwardly facing longitudinally extending groove therein,
    an article securing means disposed in part within said groove;
    said slat including means forming an aperture in said bottom wall;
    a mounting pad disposed between said article securing means and said bottom wall of said slat and the surface portion; and
    a pair of longitudinally spaced resilient fingers extending upwardly from said mounting pad and through said aperture to releasably retain said mounting pad and said slat together as an integral unit.

11. An article carrier as set forth in claim 10 wherein said article securing means comprises an end cap member having a tie-down eyelet.

12. An article carrier as set forth in claim 10 wherein each of said fingers include a slot to allow said each of said fingers to overlap said slat when disposed in said aperture.

13. An article carrier as set forth in claim 12 including fastening means disposed within said groove and extending downwardly through said article securing means and said slat through the surface portion for securing said article securing means within said groove and said slat to the surface portion.

14. An article carrier as set forth in claim 13 wherein said fastening means comprises a threaded fastener element.

15. In an article carrier for an automotive vehicle, an article supporting slat adapted to be mounted in contiguous relationship to a surface portion of the vehicle,
    said slat extending generally parallel to the surface portion,
    said slat having a bottom wall and a pair of upwardly extending side walls, said side walls defining an upwardly presenting groove,
    a one-piece end cap member interfitted with one end of said slat and including a tongue adapted to be received within said groove;
    a mounting pad disposed between said end cap member and said bottom wall of said slat and the surface portion;
    single fastening means adapted to secure said end cap member and said slat to the surface portion;
    said end cap member being disposed in longitudinal abutting relationship with said slat;
    said single fastening means comprising a threaded fastener element extending through said tongue of said end cap member and said slat and through the surface portion;
    said end cap member including means forming an eyelet;
    said tongue including means forming an aperture to allow said threaded fastener element to pass through;
    a pair of longitudinally spaced resilient fingers extending upwardly from said mounting pad;
    said slat includes means forming an aperture in said bottom wall of said slat, said fingers extending through said aperture to releasably retain said mounting pad and said slat together as an integral unit; and
    each of said fingers including a slot to allow said each of said fingers to overlap said slat when disposed in said aperture.

* * * * *